W. E. BRIGHAM.
Ice-Tongs.
No. 206,659. Patented Aug. 6, 1878.
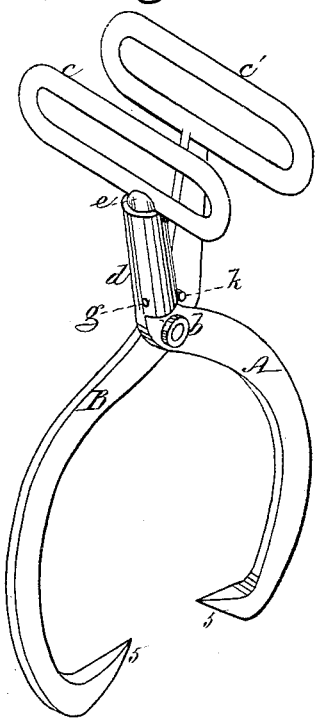
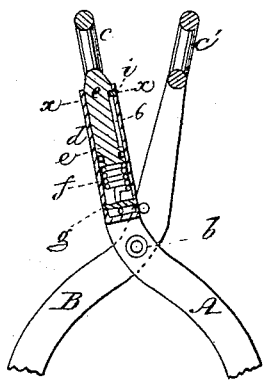
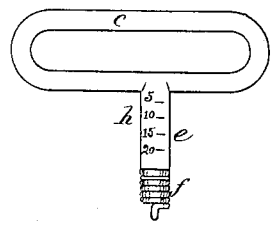

UNITED STATES PATENT OFFICE.

WILLIAM E. BRIGHAM, OF BOSTON, MASSACHUSETTS.

IMPROVEMENT IN ICE-TONGS.

Specification forming part of Letters Patent No. 206,659, dated August 6, 1878; application filed July 8, 1878.

*To all whom it may concern:*

Be it known that I, WILLIAM E. BRIGHAM, of Boston, in the county of Suffolk and State of Massachusetts, have invented an Improvement in Tongs for Grasping Ice and other Substances, of which the following is a full, clear, and exact description, reference being had to the accompanying drawings, making part of this specification, in which—

Figure 1 is a perspective view of a pair of ice-tongs constructed in accordance with my invention. Fig. 2 is a vertical section through the same. Fig. 3 is a transverse section on the line $x\ x$ of Fig. 2; Fig. 4, detail.

This invention consists in a pair of tongs for grasping ice or other substance and a weighing device combined in a single implement, which is thus particularly adapted for the use of families and retailers of ice, as the weight of the piece of ice or other substance grasped by the tongs can be readily ascertained without the necessity of employing separate scales, as heretofore, and much trouble and inconvenience thereby avoided.

To enable others skilled in the art to understand and use my invention, I will proceed to describe the manner in which I have carried it out.

In the said drawings, A B represent the two arms or levers of a pair of ice-tongs, which are pivoted together at $b$, and provided, as usual, at their upper ends, with loops or handles $c\ c'$, and at their lower extremities with inwardly-projecting spurs 5, for grasping and holding the ice between them.

The upper portion, $d$, of the lever A is made tubular, and within this hollow portion is fitted, so as to slide snugly therein, a rod, $e$, carrying at its upper end the handle $c$. To the bottom of the sliding rod $e$ is securely attached a spiral spring, $f$, the lower end of which is secured at the bottom of the tubular portion $d$ by means of a screw-pin, $g$, entered from the outside, and passing through a loop or hook formed at the bottom of the spring. The sliding rod $e$ is provided on one side with a graduated scale, $h$, Fig. 4, for the purpose of indicating above the upper edge of the portion $d$ the distance to which it is drawn out against the resistance of the spring $f$ by the weight of the piece of ice grasped between the levers A B when the tongs are held up by the handle $c$, and, as the spring is properly adjusted for the purpose, the weight of the piece of ice will be accurately indicated on the scale $h$, as desired, and the necessity of employing a separate weighing apparatus, as heretofore, is thus entirely avoided, the tongs and scales being always together ready for use, a combined implement being thus produced, which will be found extremely convenient for the use of retail ice-dealers and families.

$i$ is a pin which projects through the tubular portion $d$, near its top, into a long narrow recess, 6, in the rod $e$, whereby the latter is prevented from turning on its axis and the distance to which it can be drawn out limited, thus preventing the liability of straining or breaking the spring $f$ by an undue weight. The rod $e$ and the interior of the tubular portion $d$, within which it slides, may be of polygonal form in cross-section, instead of circular, if preferred.

$k$ is a stop-pin projecting from the lever B, for the purpose of preventing the handles $c\ c'$ from approaching each other too closely.

I do not confine myself to the construction of the spring weighing device shown, as it may be varied without departing from the spirit of my invention. For instance, the tubular portion which incloses the spring $f$ may be connected with the handle $c$, and the piece sliding within it with the lever A. In all cases, however, the weighing device must be applied to one of the levers A or B, between its handle and the pivot $b$.

My combined tongs and scales may be used for grasping other substances than ice—for example, hay, cotton, &c.—the size of the implement being proportioned to adapt it to the use to which it is to be applied.

What I claim as my invention, and desire to secure by Letters Patent, is—

The combination, with a pair of tongs for grasping ice or other substance, of a spring weighing device applied to one of the levers, A or B, at a point between the handle and the pivot $b$, substantially as and for the purpose set forth.

Witness my hand this 3d day of July, A. D. 1878.

WILLIAM E. BRIGHAM.

In presence of—
P. E. TESCHEMACHER,
W. J. CAMBRIDGE.